US012563251B2

(12) United States Patent
Nilsson et al.

(10) Patent No.: US 12,563,251 B2
(45) Date of Patent: Feb. 24, 2026

(54) CONTENT DELIVERY

(71) Applicant: British Telecommunications Public Limited Company, London (GB)

(72) Inventors: Michael Nilsson, London (GB); Stephen Appleby, London (GB); Timothy Stevens, London (GB); Rory Turnbull, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/695,755

(22) PCT Filed: Sep. 20, 2022

(86) PCT No.: PCT/EP2022/076046
§ 371 (c)(1),
(2) Date: Mar. 26, 2024

(87) PCT Pub. No.: WO2023/052191
PCT Pub. Date: Apr. 6, 2023

(65) Prior Publication Data
US 2024/0397134 A1 Nov. 28, 2024

(30) Foreign Application Priority Data
Sep. 29, 2021 (GB) ...................................... 2113881

(51) Int. Cl.
| | |
|---|---|
| *H04N 21/266* | (2011.01) |
| *H04N 21/6405* | (2011.01) |
| *H04N 21/6408* | (2011.01) |

(52) U.S. Cl.
CPC ... *H04N 21/26616* (2013.01); *H04N 21/6405* (2013.01); *H04N 21/6408* (2013.01)

(58) Field of Classification Search
None
See application file for complete search history.

(56) References Cited

U.S. PATENT DOCUMENTS

| | | | |
|---|---|---|---|
| 9,065,700 B2 | 6/2015 | Horn | |
| 9,374,410 B2 | 6/2016 | Mantin | |
| | (Continued) | | |

FOREIGN PATENT DOCUMENTS

| | | | | |
|---|---|---|---|---|
| EP | 1187488 A2 * | 3/2002 | ......... | H04N 21/6377 |
| EP | 3435616 A1 | 1/2019 | | |
| | (Continued) | | | |

OTHER PUBLICATIONS

International Preliminary Report on Patentability and Written Opinion of the International Searching Authority dated Apr. 11, 2024, issued for International Application No. PCT/EP2022/076045 (8 pages).

(Continued)

*Primary Examiner* — William J Kim
(74) *Attorney, Agent, or Firm* — Nixon & Vanderhye P.C.

(57) ABSTRACT

A method of managing content delivery to a client device via a proxy is described. The proxy starts off by receiving content requests from the client device over unicast, and fulfils those requests by forwarding them to a content server, and receiving that content before forwarding onto the client device. The proxy then determines that it may be possible to join a multicast channel to more efficiently receive the required content. However, before joining the multicast channel, the proxy determines whether joining the multicast channel might result in the client device receiving content in a manner that would cause the client device to change the quality level of the content segments being requested. The proxy can do this by first obtaining segment requested by the client device from the unicast server over unicast. The proxy also requests timing information from the multicast server to (Continued)

Key

102 Content Source
104 Content Encoder
106 Multicast Transmitter
110 Unicast Server
112 Proxy
114 Client Device ⟶ Content Production
⟷ Bi-directional unicast
⤍ Uni-directional multicast determine a time at which the same segment will complete delivery over multicast. The proxy then delivers the segment received from the unicast server by the determined multicast delivery time.

16 Claims, 2 Drawing Sheets

(56) References Cited

U.S. PATENT DOCUMENTS

| | | | |
|---|---|---|---|
| 10,484,441 | B2 | 11/2019 | Kotecha et al. |
| 10,523,572 | B2 | 12/2019 | Li |
| 10,630,746 | B1 * | 4/2020 | Shen .................. H04L 65/70 |
| 10,735,823 | B2 | 8/2020 | Harden |
| 11,553,018 | B2 | 1/2023 | Mao |
| 2004/0078392 | A1 * | 4/2004 | Morita ............... H04N 21/6125 |
| 2005/0015808 | A1 * | 1/2005 | Nakamura ............ H04L 67/62 |
| | | | 725/105 |
| 2007/0147411 | A1 | 6/2007 | Bijwaard |
| 2009/0232143 | A1 * | 9/2009 | Li .................... H04W 72/569 |
| | | | 370/395.3 |
| 2010/0131992 | A1 * | 5/2010 | Kenmotsu ........ H04N 21/26275 |
| | | | 370/468 |
| 2011/0080950 | A1 * | 4/2011 | Toyota ............ H04N 21/23805 |
| | | | 375/295 |
| 2015/0358692 | A1 * | 12/2015 | Markovitz ......... H04N 21/8456 |
| | | | 725/93 |
| 2016/0182966 | A1 | 6/2016 | Hao |
| 2016/0294898 | A1 | 10/2016 | Wheelock |
| 2017/0251034 | A1 | 8/2017 | Schmidt et al. |
| 2019/0260816 | A1 | 8/2019 | Bradbury |
| 2020/0059683 | A1 | 2/2020 | Grigsby |

FOREIGN PATENT DOCUMENTS

| | | | | | |
|---|---|---|---|---|---|
| JP | 2005064583 | A | | 3/2005 | |
| JP | 2007184913 | A | * | 7/2007 | .......... H04N 19/124 |

| | | | |
|---|---|---|---|
| WO | 2014155041 | A1 | 10/2014 |
| WO | 2017125150 | A1 | 7/2017 |

OTHER PUBLICATIONS

International Preliminary Report on Patentability and Written Opinion of the International Searching Authority dated Apr. 11, 2024, issued for International Application No. PCT/EP2022/076046 (6 pages).

Combined Search and Examination Report for GB2113880 5, dated Feb. 8, 2022, 5 pages.

Combined Search and Examination Report for GB2113881 3, dated Jun. 23, 2022, 10 pages.

International Search Report and Written Opinion of the ISA for PCT/EP2022/076045, mailed Jan. 23, 2023, 13 pages.

International Search Report and Written Opinion of the ISA for PCT/EP2022/076046, mailed Jan. 18, 2023, 13 pages.

Anonymous, "IP Multicast Adaptive Bit Rate Architecture Technical Report", Nov. 12, 2024, 69 pages, retrieved from the Internet at URL: https://community.cablelabs.com/wiki/plugins/servlet/cablelabs/ alfresco/download?id=51b3c11a-3ba4-40abb234- 42700eOd4669.

De Mi, Joe Eyles et al., "Demonstrating Immersive Media Delivery on 5G Broadcast and Multicast Testing Networks", IEEE Transactions on Broadcasting, 16 pages.

Office Action issued in U.S. Appl. No. 18/695,241 dated Jun. 2, 2025 (7 pages).

Lei Xu et al., "A QoE-based DASH Multicast Grouping Algorithm for Mobile Edge Computing", 2020 IEEE/CIC International Conference on Communications in China (ICCC) (6 pages).

Niels Bouten et al., "An Autonomic Delivery Framework for HTTP Adaptive Streaming in Multicast-enabled Multimedia Access Networks", Published in 2012 IEEE Network Operations and Management Symposium (6 pages).

Communication pursuant to Article 94(3) EPC dated Oct. 24, 2025, issued for European Application No. 22 793 130-0 (4 pages).

* cited by examiner

100

Key

Content Production

Bi-directional unicast

Uni-directional multicast

102 Content Source
104 Content Encoder
106 Multicast Transmitter
110 Unicast Server
112 Proxy
114 Client Device

CONTENT DELIVERY

CROSS-REFERENCE TO RELATED APPLICATIONS

This application is the U.S. national phase of International Application No. PCT/EP2022/076046 filed Sep. 20, 2022 which designated the U.S. and claims priority to GB 2113881.3 filed Sep. 29, 2021, the entire contents of each of which are hereby incorporated by reference.

FIELD OF THE INVENTION

This invention relates to the field of managing content delivery in a network, in particular managing content delivery using a combination of unicast and multicast.

BACKGROUND TO THE INVENTION

Video content is currently delivered to a range of client devices using unicast delivery, where a single stream of data is transmitted to each individual client device. Web (HTTP) technology is used for the content delivery, where the content is segmented into short segment files, typically around six to ten seconds in duration, enabling each segment file to be requested by and delivered to the client device using HTTP.

Each segment may also be encoded at a set of quality levels, each with a different bit rate and hence different file size. The client device monitors its buffer level and the network throughput achieved, and determines from these at which quality to request the next segment in order to achieve a good compromise between media quality and timely delivery. This is commonly referred to as adaptive bitrate (ABR) streaming.

However, HTTP is delivered over unicast (one to one) transport, so is inefficient for delivering the same content at the same time to many client devices. Multicast (one to many) transport would be far more efficient. Yet multicast is currently rarely used for any services other than network operators' on-net linear video channels delivered to their own set-top boxes. The main reason for this is that multicast does not lend itself to open use on the Internet.

To bring the benefits of multicast scalability to HTTP-based Internet media streaming, a class of techniques known as Multicast-Adaptive Bitrate (m-ABR) is being investigated and standardised.

Multicast-Adaptive Bitrate (m-ABR) is a relatively new technology. It aims to allow more efficient delivery of ABR content over networks by enabling the use of multicast for content streams where many clients are requesting the same content at about the same time.

One ambition of many m-ABR systems is to deploy multicast and enable m-ABR without any change to the client device and the client application that are already supporting HTTP (unicast) streaming. This can be achieved using a hybrid approach that uses a combination of both multicast and unicast delivery, where a proxy is inserted between the client device and the content server. The proxy can inspect content requests from the client device, and when appropriate, subscribe to a multicast stream, receive multicast content, and provide this content to the client, packaged to look like unicast delivered content.

Examples of such hybrid solutions include: "IP Multicast Adaptive Bit Rate Architecture Technical Report" OC-TR-IP-MULTI-ARCH-C01-161026, 26 Oct. 2016, by Cable Labs; 3GPP specifications, 23.246 (MBMS Architecture and functional description), 26.346 (MBMS Protocols and codecs) and 26.347 (MBMS APIs); and DVB "Adaptive Media Streaming over IP Multicast" ETSI TS 103 769 V1.1.1 (2020 November).

Problems can occur when switching from unicast to multicast delivery in current hybrid solutions.

One problem is that some client devices may make unicast requests for content segments before the data of those content segments have been fully delivered on the multicast channel to the proxy. In such cases the proxy cannot complete delivery of the content segment over unicast to the client device until the entire content segment has been received on the multicast channel.

This slow or delayed delivery of content to the client device, which is behaving as a normal ABR streaming device, may cause the client device to change the quality level of the content segments being requested, as the slow delivery of content segments would be seen as indicative of a slow network connection. This then in turn makes the data being received at the proxy over multicast unsuitable (it is at the wrong quality level) to satisfy the new requests made by the client device, which may cause the proxy to leave the multicast channel and return to satisfying the requests from the client device by obtaining the data by unicast.

Some solutions currently available prevent the client device from adapting to a different quality level by signalling that the content is only available at a single bit rate. However, this gives a poor user experience with interruptions to the presentation of content at the client device when data is not delivered over the network in time. Such interruptions may cause the presentation of content to stall and/or some content not to be presented at all.

In short, problems can occur when trying to switch to from unicast delivery to multicast delivery when the content segments made available on the multicast channel are not provided soon enough after they are requested by the client device. This can happen when, in effect, the multicast channel is providing segments that are behind those that are available over unicast.

SUMMARY OF THE INVENTION

It is the aim of examples of the present invention to provide an improved content delivery mechanism that addresses one or more of the above problems.

According to one example of the invention, there is provided a method of managing content delivery to a client device by a network element as set out in claim 1.

The delivery time may be determined using data obtained from the multicast transmitter. The data may comprise delivery time information.

The delivery time may be further determined using the transmission rate of the multicast channel and the size of the first segment, and the data may comprise the time that transmission of the first segment started on the multicast channel.

The delivery time may be determined using delivery time data associated with previously delivered segments.

The method may further comprise receiving a request for a second segment from the client device, wherein the second segment is encoded at a second quality level; and deciding to join the multicast channel in dependence on whether the first and second quality levels are equal.

According to another example of the invention, there is provided a network element for managing content delivery to a client device as set out in claim 6.

This invention covers methods that do not require the proxy to join the multicast stream to determine whether the timing of the multicast stream relative to the timing of client requests would cause the client to adapt if multicast delivery were used. The invention ensures that the proxy only joins the multicast stream when it is possible to use that stream to deliver content to the client device in a timely manner.

If a proxy were to join a multicast stream over a bandwidth constrained network, and then be unable to deliver the content received by multicast to the client device using unicast without the client device adapting to a lower quality encoding, a significant fraction of the network bandwidth from the proxy to the content source would be wasted with multicast traffic, possibly forcing the client device to adapt to an unnecessarily low level of video quality.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of managing content delivery to a client device by a proxy, where the content is made up of a sequence of content segments. The proxy starts off by receiving content requests from the client device over unicast, and fulfilling those requests by forwarding them to a content server, and receiving that content before forwarding onto the client device. At some stage, the proxy determines that it may be possible to join a multicast channel to more efficiently receive the required content.

However, some client devices may make unicast requests for content segments before the data of those content segments have been fully delivered on the multicast channel. This may cause content segments to be delivered to the client device later than if the proxy had obtained those content segments from the content server using unicast. This slow or delayed delivery of content to the client device may cause the client device to change the quality level of the content segments being requested as described earlier.

Therefore, in examples of the invention, a multicast join command is not issued immediately by the proxy when a decision is made to utilise multicast. Instead, the proxy determines whether, in the event of data being received at the proxy by multicast and then delivered to the client device in response to the requests from the client device, the client device would change the quality level of the content segments being requested. This may be done by the proxy receiving a request for a content segment from the client device, and obtaining that segment from the unicast server over unicast. The proxy also requests timing information from the multicast server to determine a time at which the same segment will complete delivery over multicast. The proxy then delivers the segment received from the unicast server by the determined multicast delivery time.

If the proxy determines that the client device changes the quality level of the content segments being requested (due to segments being delivered too late/slowly using the multicast delivery times), the proxy decides not to use a multicast channel to more efficiently receive the required content, and hence does not issue a multicast join command.

Otherwise, if the proxy determines that the client device does not change the quality level of the content segments being requested, the proxy then takes action to join the multicast channel, such as by issuing an IGMP join request.

Figure 1:
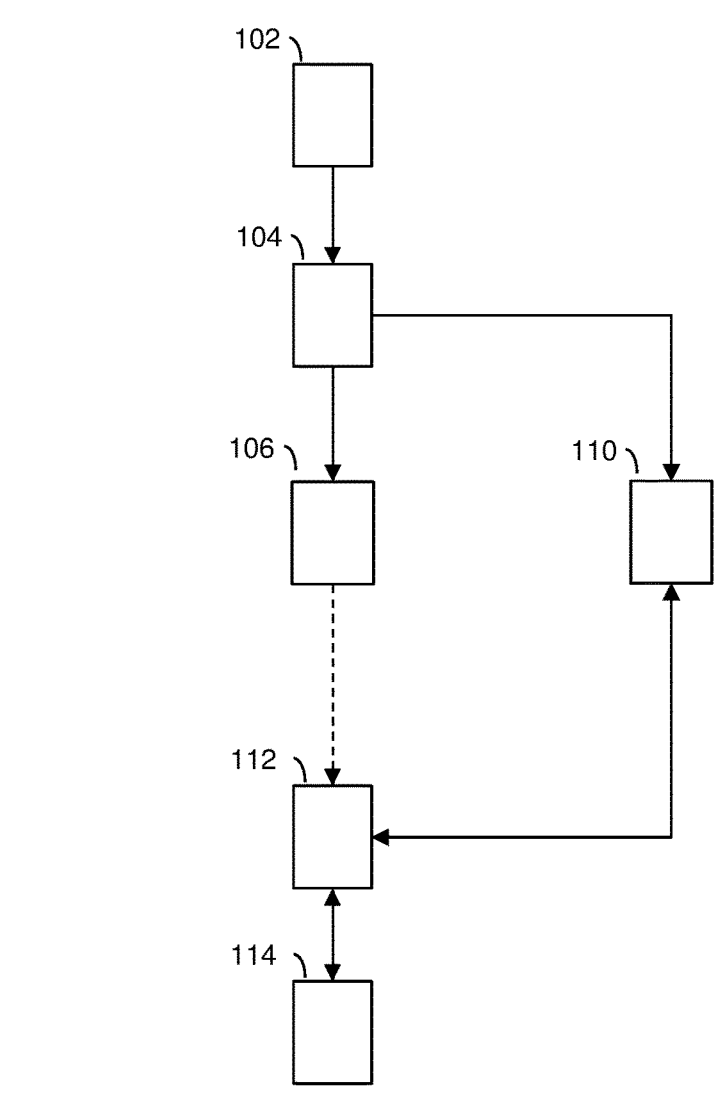
FIG. 1 system diagram showing the main components of an example of the present invention.
Figure 1:
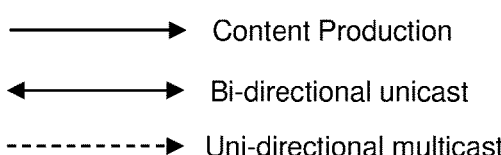
Figure 1:
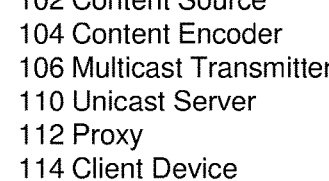

FIG. 1 shows an adaptive bit rate (ABR) streaming system 100 comprising the main components of an example of the invention. The system 100 comprises a content source 102, a content encoder 104, a multicast transmitter 106, a unicast content server 110, a proxy 112 and a client device 114. The content source 102 provides content, such as a live sports or TV broadcast, in the form of video sequences to the content encoder 104.

The proxy 112 may be located within a device such as a home gateway or router.

The client device 114 is assumed to be running a client application, which is the source of content requests. For simplicity, the term client device has been used to refer to a client device running a client application.

The content encoder 104 receives the content from the content source 102 and encodes it using a suitable compression scheme, such as ITU-T Recommendation H.264 for video content, and content segments the encoded content into a sequence of content segments, each content segment typically of duration 2 to 10 seconds. The content encoder 104 also encodes the content at one or more quality levels or bit rates, resulting in one or more (at each quality level) encoded content segments corresponding to each uncompressed content segment. Such an arrangement is typical of an adaptive bit rate streaming service.

The content encoder 104 passes the encoded content segment data, encoded at all of the required bit rates, to the unicast server 110 where the data is stored and made available for delivery by unicast. The unicast server 110 responds to unicast requests for content segments with unicast responses using the stored data.

The content segments encoded at one quality level, corresponding to one encoded bit rate, are passed to the multicast transmitter 106 for transmission by multicast to any devices that have subscribed to the respective multicast channel. However, the invention is not limited to this case, and also applies when content segments encoded at a plurality of quality settings, corresponding to a plurality of encoded bit rates, are passed to the multicast transmitter 106 for transmission by multicast on a plurality of multicast channels (one channel per quality setting).

The multicast transmitter 106 may start to transmit content segments before, at the same time, or after they have been made available on the unicast server 110. The multicast transmitter 106 may transmit content segments at a constant bit rate, approximately equal to their encoding rate, to fully utilise the multicast channel. However, the unicast server 110 may be able to deliver content segments at a higher bit rate, and hence complete the delivery of a content segment to a client device 114 or proxy 112 before the same content segment has been fully delivered on the multicast channel, even when transmission of the content segment started on the multicast channel before delivery by unicast from the unicast server 110 started.

The multicast transmitter 106 may be configured in one of various modes of operation.

In one mode of operation, the unicast server 110 monitors the requests for content segments made by a plurality of client devices. When the unicast server 110 determines that a sufficient number of client devices have requested the same content segment at about the same time, it instructs the multicast transmitter 106 to transmit the content segment on the multicast channel, in the expectation that it would subsequently be requested by additional client devices. The multicast transmitter 106 obtains the content segment from the unicast server 110 and converts the content segment data into a format suitable for multicast delivery, and then transmits it on the multicast channel to all devices that have subscribed to that multicast stream.

In another mode of operation, the multicast transmitter 106 is configured for specific content, such as a television channel, at a specific encoding quality level. Content segments encoded at the specific quality setting, corresponding to one encoded bit rate, are passed from the content encoder 104 to the multicast transmitter 106 for transmission by multicast to all the devices that have subscribed to the respective multicast source. The multicast transmitter 106 may be configured to take account of buffering requirements on the plurality of proxies that receive the multicast data and store content segments until requested by client devices. When data is delivered by multicast significantly before it has been requested by a large number of client devices, each associated proxy must buffer the multicast data. To reduce overall system storage requirements, the multicast transmitter 106 is configured to delay the transmission of a content segment by multicast for a short period of time, such as a few seconds, relative to the time at which the content segment is made available on the unicast server 110 to align the timing of the delivery of content segments by multicast more closely with the timing of the requesting of the content segments by the client devices, to reduce the storage requirements of the proxy.

However, the invention is not limited to these two configurations of the multicast transmitter 106.

Regardless of which configuration of multicast transmitter 106 is used, some client devices may request content segments before they have been fully delivered on the multicast channel.

To request content segments, the client device 114 can first obtain a manifest file from the unicast server 110. Manifest files are used by client devices to identify where content segments are located (by a URL in the manifest). The client device 114 can then request these content segments in sequence using HTTP requests from the unicast server 110, and concatenate them to form a continuous stream of content segments for playback. As each content segment is available on the unicast server 110 at a plurality of encoded bit rates, the client device 110 determines for each content segment, the encoded bit rate (quality) at which to request it, taking into account such factors as the available network throughput and how much data is already received and buffered at the client device awaiting play-out.

Some HTTP requests made by the client device 114 for content will not make use of multicast delivery and are sent directly to the unicast server 110, which delivers the requested content by unicast. Other requests for content from the client device 114 that may benefit from multicast delivery are re-directed to, or simply intercepted by, the proxy 112, and can be handled in accordance with the examples described below.

The proxy 112 can be inserted in the HTTP path using any of a number of well-known techniques, such as using an HTTP redirection from the unicast server 110. In this case, the unicast server 110 would be configured such that requests for potentially popular content are not served directly but instead redirected to a suitable proxy. For example, instead of supplying a normal response, the unicast server 110 could respond with an HTTP status code 307 which indicates a temporary redirect. This invites the client device 114 to make a new request to the new URL supplied by the unicast server 110 in its response, thus enabling requests to be made to the proxy 112. This technique allows the unicast server 110 and the proxy 112 to exist in different domains, which would often be the case.

Other mechanisms to insert the proxy 112 in the HTTP path include: proxy configured as a transparent proxy (though all requests are intercepted by it, and only works with unencrypted traffic); proxy configured as a forward proxy (where the client device sends its requests directly to the proxy by virtue of being explicitly configured to do so); DNS hijacking (where a DNS server is configured to supply the IP address of the proxy for domains of interest); and manifest manipulation (where the manifest file is re-written so that requests are made directly to the proxy).

The client device 114 could request and receive content segments from the unicast server 110 from the start to the end of a streaming session. However, in some cases the proxy 112 determines that multicast delivery could be used to receive some content segments.

The proxy 112 monitors unicast content requests from the client device 114 and is aware of when content requested by the client device 114 could be received by multicast.

The proxy 112 determines whether it is possible to satisfy the client device's requests for content using data that could be delivered by multicast. If so, the proxy 112 joins the relevant multicast channel at an appropriate time. After receiving data by multicast, the proxy 112 replies to the client device's requests for unicast content with content received by multicast, but packaged as unicast content responses.

The client device 114 does not need to be aware of the proxy 112 and does not need to be aware of whether content is being delivered by unicast from the unicast content source via the proxy, or is delivered by multicast to the proxy which then delivers the content to the client device 114 in a unicast format.

There are many ways in which the proxy 112 may determine it is possible to satisfy the client device's requests for content using data that could be delivered by multicast.

For example, if client device 114 has made a plurality of consecutive requests for content segments at the same encoding quality level, that quality level is available by multicast delivery, and each of these content segments has been delivered in less time than the content segment period.

In another example, the proxy 112 may ignore the fact that some content segments have taken more time than a content segment period to be delivered, provided that many content segments are delivered in much less than a content segment period. The proxy 112 may also ignore some variations in the quality at which content segments are requested, if for much or all of the time there is easily sufficient network throughput to deliver content segments at the quality level available by multicast.

In typical systems, when the proxy 112 has decided to satisfy the client device's requests for content using data that could be delivered by multicast, the proxy 112 stops forwarding the client device's requests for content to the unicast server 110, and instead takes appropriate action to join and obtain from the multicast channel, the data requested by the client device 114. The proxy 112 then delivers that content received over multicast to the client device 114, with the data formatted as a unicast response.

However, such an approach that does not take into account the relative timing of requests from the client device 114 for content segments and the delivery of those content segments by multicast, can result in problems.

If a client device 114 makes a request for a content segment before the data of that content segment has been fully delivered on the multicast channel, the proxy 112 cannot complete delivery of that content segment to the client device until the entire content segment has been received on the multicast channel. The minimum time in which the proxy 112 could fully respond to the request from the client device 114 is the time between the client device 114 making the request and the time the content segment is fully delivered by multicast added to any additional time required to forward the content segment to the client device 114.

This constraint on the timing of the delivery of content segment data to the client device 114, which is behaving as a normal ABR streaming device, may cause it to run out of data and presentation of content to stall, or it may cause it to change the quality level of the content segments being requested, as the slow delivery of content segments would be seen as indicative of a slow network connection. This then in turn makes the data being received at the proxy 112 over multicast unsuitable (it is at the wrong quality level) to satisfy the new requests made by the client device 114, which may cause the proxy 112 to leave the multicast channel and return to satisfying the requests from the client device 114 by obtaining the data by unicast.

Described now is an example of how content can be delivered in an improved manner.

The proxy 112 determines that a multicast channel could be joined as described above. However, instead of issuing a command to join (such by an IGMP join request) the multicast channel immediately, the proxy 112 considers the relative timing of the requests for content segments from the client device 114 and the transmission of those content segments on the multicast channel. In effect, the proxy 112 probes the multicast transmitter 106 for timing data associated with transmitted content segments.

To do this, the proxy 112 continues to send requests for content segments received from the client device 114 to the unicast server 110, which delivers the requested content segment by unicast back to the proxy 112. The proxy 112 also requests information from the multicast transmitter 106 about when transmission of the same content segments will finish on the multicast channel. The proxy 112 determines the times at which delivery of the content segments requested by the client device 114 will be completed on the multicast channel, and delivers the content segments received from the unicast server 110 to the client device 114 at such a rate as to finish delivery at approximately the times that transmission will finish on the multicast channel.

The proxy 112 determines whether this timing of the delivery of data to the client device 114 in response to its requests for content segments causes the client device 114 to request content segments at a different (lower) quality level.

If the proxy 112 determines that this did not cause the client device 114 to request further content segments at a different (lower) quality level, the proxy 112 can then take action to join the multicast channel, such as by issuing an IGMP join request.

The proxy 112 stops forwarding the client device's requests for content to the unicast server 110, and instead receives the data requested by the client device 114 on the multicast channel. The proxy 112 then delivers that content received over multicast to the client device 114, with the data formatted as unicast responses.

The specific manner in which probing can be done by the proxy server 112 is now described in more detail.

After the proxy 112 has determined that a multicast channel can joined, it periodically queries the multicast transmitter 106 to determine when the transmission of content segments are completed on the multicast channel, and when the transmission of other content segments will complete. The proxy 112 stores the responses from multicast transmitter 106.

When the proxy 112 receives a request for a content segment from the client device 114, it forwards that request to the unicast server 110, which delivers the requested content segment by unicast back to the proxy 112. The proxy 112 determines the time at which it would receive the requested content segment on the multicast channel, if it were subscribed to that channel, which at this time it isn't. The proxy 112 determines this using the stored responses from the multicast transmitter 106. The proxy 112 then determines the rate at which to deliver the content segment to the client device 114 to match or be approximately the rate it would be able to perform that delivery if it had received the content segment on the multicast channel rather than by unicast. The proxy 112 then delivers the content segment to the client device 114 at that determined rate using unicast.

The multicast transmitter 106 responds to queries from the proxy 112 with the times at which content segments completed delivery on the multicast channel. It may also be able to respond to the proxy 112 with estimates of the times at which content segments are expected to complete delivery on the multicast channel.

For example, the multicast transmitter 106 could estimate the time, $M_i$, at which transmission of a segment, with index i, will finish on the multicast channel if it knows: the transmission rate, R, of the multicast channel; the size of the content segment in bytes, $B_i$, before the time the transmission of the content segment finishes on the multicast channel; the time, $S_i$, that transmission of the content segment started on the multicast channel (or a determination of when it is expected to start). This is shown in equation (1) below:

$$M_i = S_i + \frac{B_i}{R} \qquad (1)$$

The multicast transmitter 106 may know the size of the content segment in bytes, $B_i$, before the time the transmission of the content segment finishes on the multicast channel, in the case where for example, a content segment is first made available for delivery by unicast and then later, after having been requested by a plurality of client devices, transmitted on the multicast channel. The multicast transmitter 106 may also have this knowledge when the delivery of data on the multicast channel has been delayed to reduce the buffering requirements of proxy devices in consideration of the timing of the requests for content segments from a majority of client devices, as described above.

The multicast transmitter 106 may respond to the proxy 212 immediately if the value of $M_i$ is known or it has been able to determine an estimate for $M_i$, otherwise it may respond later when it has been able to determine a value.

When the proxy 112 is delivering the content segment with index i to the client device 114 over unicast, it controls the rate of that delivery to finish at approximately the time $M_i$, or as close to this time as it is possible to achieve.

If the proxy 112 has received and stored a value of $M_i$ from the multicast transmitter 106, it can use the stored value. Otherwise if a value has not been received and stored, but the time at which an earlier content segment, $M_{i-n}$, has been received and stored, the proxy 112 can determine a value of $M_i$ by adding n content segment periods, T, to the value of $M_{i-n}$:

$$M_i = M_{i-n} + nT \qquad (2)$$

If the proxy 112 has received and stored the values of $M_{i-n}$ for more than one earlier content segment, the proxy 112 could determine an estimate for $M_i$ from one or more of these, and in the case of more than one, combine the estimates to get a possibly improved estimate of $M_i$. The combination process could be calculating the average, median, maximum or minimum, or any other calculation using the stored values of $M_{i-n}$.

The proxy 112, while awaiting a value of $M_i$ from the multicast transmitter 106, or determining a value of $M_i$ itself, requests the content segment with index i from the unicast server 110 and buffers the response.

The proxy 112 may choose to start delivery of the content segment with index i to the client device 114 over unicast as soon as this content segment starts to be received from the unicast server 110, or it may wait until the value of $M_i$ is known. In either case, the proxy 112 controls the rate at which the content segment is delivered to the client device 114 so that delivery completes at time $M_i$, or as close to this time as it is possible to achieve.

This timing of the response to the request from the client device 114 for the content segment with index i may cause the client device 114 to request the next content segment, with index (i+1), at a lower quality. If this occurs, the proxy 112 determines that the use of multicast is not suitable for satisfying the requests from the client device 114, and proceeds to satisfy subsequent requests for content segments by making requests to the unicast server 110, and forwarding the data received over unicast to the client device 114 as fast as possible over unicast. It is likely that the client device 114 would adapt quickly back to requesting content segments at the higher level of quality.

Otherwise, the proxy 112 continues the process above, of obtaining or calculating values of $M_i$, for subsequent content segments requested by the client device 114, requesting those content segments from the unicast server 110, and delivering the content segment data to the client device 114 over unicast at a rate such that delivery finishes at times $M_i$, or as close to this time as it is possible to achieve.

If the client device 114 makes a request for a content segment at a lower quality (lower encoded bit rate), the proxy device 112 may abort this process as described above, and revert to satisfying the requests from the client device 114 with data obtained from the unicast server 110 as quickly as possible using unicast.

However, if after delivering a number of content segments to the client device 114 with this modified timing where the delivery of content segments finishes at the times $M_i$, or as close to this time as it is possible to achieve, and the client device 114 has not made a request for a content segment at a lower quality (lower encoded bit rate), the proxy 112 may choose to subscribe to the multicast channel. This can be done by, for example, issuing an IGMP join request, and then the proxy 112 can receive data on the multicast channel and use this data to satisfy the requests for content segments made by the client device 114.

By imitating the timing of the delivery of content segments to the client device 114 that would occur if multicast delivery were used, without actually joining the multicast channel, the proxy 112 can reduce the impact on the viewer's quality of experience caused by the client device 114 adapting and requesting content segments at a lower quality (lower encoded bit rate), due to the timing of multicast-delivered data.

Although in the case of multicast content segment delivery timing being unsuitable for the client device 114, the imitation would cause the client device 114 to adapt to requesting content segments at a lower quality (lower encoded bit rate), this adaptation is likely to be only to a slightly reduced quality (encoded bit rate), and to be only for a short period of time. Whereas if the proxy 112 did join the multicast channel, and then the client device 114 adapted to requesting content segments at a lower quality (lower encoded bit rate), the network connection to the proxy 112 may be insufficient for both the multicast channel and unicast delivery of the lower quality content segments, in which case the client device 114 may adapt to requesting content segments at a much lower quality (much lower encoded bit rate) until the proxy 112 had unsubscribed from the multicast channel.

Figure 2:
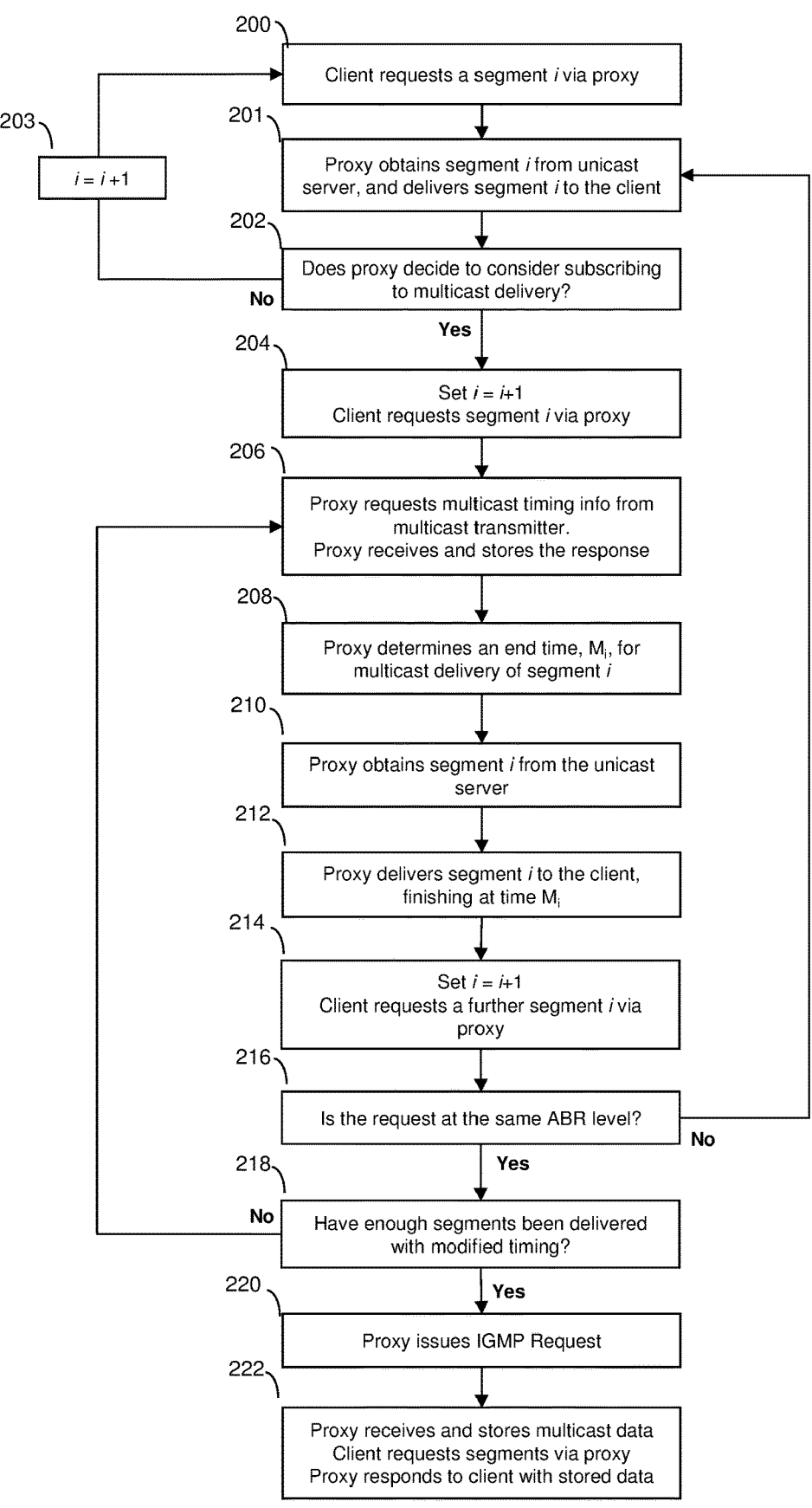
FIG. 2 is a flow chart summarising the steps of an example of the invention.

FIG. 2 shows a flow chart summarising the steps of an example of the present invention, and largely mirrors the methods already described.

Starting at step 200, the client device 114 makes a request for a content segment, here segment i, stored at the unicast server 110. The proxy 112 intercepts this request, and forwards the request to the unicast server 110.

In step 201, the proxy 112 receives the requested content segment i by unicast from the unicast server 110, and forwards this data to the client device 114 as a unicast response to the request from the client device 114. The client device 114 receives this content segment, which can then be played out.

The client device 114 can request content segments using HTTP GET requests, which are unicast in nature, directed to content segments encoded at a particular bit rate. This initial or first bit rate may be chosen to be the lowest bit rate available, or the bit rate could be chosen in some other way, such as based on historical data or user preference. Each HTTP GET request includes the URL of where that content segment can be retrieved from. The URLs are found in the manifest file associated with the content.

In step 202, the proxy 112 decides whether to consider subscribing to multicast delivery. This decision can be made dependent on many factors, including whether the client device 114 has been requesting content that is available by multicast, whether the quality level of content segments requested by the client device 114 are being delivered by multicast, whether the client device 114 has been requesting only content segments at this quality level for some time, and whether the proxy 112 considers there to be sufficient bandwidth to the client device 114 to maintain timely delivery of content segment data at this quality level.

If the proxy 112 decides to consider subscribing to multicast delivery, flow passes to step 204, otherwise flow passes back to step 200 via step 203, where the segment number is incremented by setting i=i+1. The proxy 112 continues to receive and respond as before to unicast requests for further segments from the client device 114.

In step 204, the segment number is incremented with i=i+1, and the client device 114 makes a request for the next content segment with index i.

In step 206, the proxy 112 requests from the multicast transmitter 106 timing information relating to the time, $M_i$, at which transmission of the content segment with index i is expected to be completed on the multicast channel.

Transmission of the content segment with index i may have already completed on the multicast channel, may be in progress or may not have started. The multicast transmitter 106 responds to the proxy 112 with the time, $M_i$, at which transmission of the content segment with index i completed, or is expected to be completed, on the multicast channel. If this is not known, the multicast transmitter 106 responds with the time at which earlier content segments, $M_{i-n}$, for n>0, were completely delivered on the multicast channel, and the index or indices, i-n, of those earlier content segments. The proxy receives and stores the response from the multicast transmitter 106.

In step 208, the proxy 112 determines a value for the time, $M_i$, at which transmission of the content segment with index i completed, or is expected to be completed, on the multicast channel. If the proxy 112 has received and stored this information from the multicast transmitter 106, then the stored value can be used. If a value has not been received and stored, but the time at which an earlier content segment, $M_{i-n}$, has been received and stored, either on this iteration or an earlier iteration of step 206, the proxy 112 determines a value of $M_i$ by adding n content segment periods, T, to the value of $M_{i-n}$ $$M_i = M_{i-n} + nT \qquad (3)$$

If the proxy 112 has received and stored the values of $M_{i-n}$ for more than one earlier content segment, the proxy 112 could determine an estimate for $M_i$ from one or more of these, and in the case of more than one, combine the estimates to get a possibly improved estimate of $M_i$. The combination process could be calculating the average, median, maximum or minimum of $M_{i-n}$, or any other suitable calculation.

In step 210, the proxy 112 requests and obtains the content segment with index i from the unicast server 110 over unicast.

In step 212, the proxy 112 delivers the content segment with index i to the client device 114 as a unicast response to the request from the client device 114, at such a rate that delivery completes at time $M_i$, or as close to this time as it is possible to achieve.

In step 214, the client device 114 makes a request for a further content segment i, by first setting i=i+1. This request may be for a content segment at the same quality (encoded bit rate) as the preceding content segment with index i-1 or may be for a content segment at a different quality (encoded bit rate).

In step 216, if the client device 114 has made a request for a further content segment i at a different quality (encoded bit rate) to the preceding content segment with index i-1, the proxy 112 determines that the client device 114 is unlikely to maintain a sequence of requests for content at the same quality (encoded bit rate) as the preceding content segment with index i-1 if data were delivered to the client device 114 with timing determined by the timing of the transmission of content segments on the multicast channel. In this case flow passes to step 201 and the proxy 112 obtains the requested segment from the unicast server, and forwards this data to the client device 114 as a unicast response to the request from the client device 114. The client device 114 receives these content segments, which can then be played out, and processing continues to step 202 as described above.

However, if the request for segment i in step 216 is at the same quality level as the preceding content segment i-1, then processing passes to step 218.

In step 218, the proxy 112 determines whether a sufficient number of content segments have been delivered to the client device 114 with delivery timing determined by the timing of the transmission of content segments on the multicast channel, as performed in steps 206 to 212, to have reasonable confidence that the client device 114 is likely to maintain a sequence of requests for content at the same quality (encoded bit rate) as the preceding content segments if data were delivered to the client device 114 with timing determined by the timing of the transmission of content segments on the multicast channel.

If the proxy 112 determines the number of content segments is not yet sufficient, flow returns to step 206 to enable another content segment to be delivered to the client device 114 with timing determined by the timing of the transmission of content segments on the multicast channel. Otherwise flow passes to step 220 to join the appropriate multicast channel.

A sufficient number of content segments may be only one. Alternatively, the number could be 3, 5, 10 or even more content segments. Or the number could be the number of content segments that have a total duration above a certain threshold, such as 30 s.

In the case of the client device 114 making a request for a content segment before it starts to be transmitted on the multicast channel, the time taken for the proxy 112 to receive that content segment on the multicast channel and forward it as a unicast response to the client device 114 is longer than the time to transmit that content segment on the multicast channel. If the client device 114 waits until a request for a content segment is fully satisfied before requesting another content segment, the time at which the client device 114 would request the next content segment would be approximately the same time that transmission of that content segment begins on the multicast channel. The time taken for the proxy 112 to receive that content segment on the multicast channel and forward it as a unicast response to the client device 114 is approximately the same as the time to transmit that content segment on the multicast channel. This time to satisfy the request from the client device 114 may be shorter than the time to satisfy its previous request. Similarly, the time to satisfy subsequent requests from the client device 114 may be shorter than the time to satisfy this first request. Hence it may be satisfactory in this case for the proxy 112 to set the sufficient number of content segments to one.

In step 220, the proxy 112 initiates the process of joining the multicast channel. This may be done for example by issuing an IGMP Join request.

In step 222, the proxy 112 receives data on the multicast channel and stores that data. The client device 114 makes requests for content segments stored at the unicast server 110. The proxy 112 intercepts these requests and responds to the client device 114 with unicast responses including data that had been received and stored in earlier steps. This data may have been received at the proxy 112 by unicast delivery or by multicast delivery on the multicast channel. The content segments are received by the client device 114, and can then be played-out.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery to a client device by a network element, said content comprising a sequence of segments, and wherein each segment is encoded at a plurality of quality levels, said method comprising:

i) receiving a request for a first segment from a client device, wherein the first segment is encoded at a first quality level;

ii) requesting the first segment from a unicast content source, and in response receiving the first segment by unicast from the unicast source;

iii) determining a delivery time that the first segment will be delivered over a multicast channel;

iv) delivering the received first segment to the client device over unicast at the determined delivery time;

v) receiving a request for a second segment from the client device, wherein the second segment is encoded at a second quality level; and vi) deciding to join the multicast channel in dependence on whether the first and second quality levels are equal.

2. A method according to claim 1, wherein the delivery time is determined using data obtained from a multicast transmitter.

3. A method according to claim 2, wherein the data comprises delivery time information.

4. A method according to claim 2, wherein the delivery time is further determined using a transmission rate of the multicast channel and a size of the first segment, and the data comprises the time that transmission of the first segment started on the multicast channel.

5. A method according to claim 1, wherein the delivery time is determined using delivery time data associated with previously delivered segments.

6. The method according to claim 1, wherein the network element is a proxy network element arranged within a device, wherein the device is a gateway or a router, and wherein the device is arranged between the client device and the unicast content source.

7. The method according to claim 1, further comprising requesting timing information from a multicast server to determine the delivery time that the first segment will be delivered over the multicast channel.

8. A method according to claim 1, further comprising making a decision to not join the multicast channel in dependence on the first and second quality levels being different.

9. An apparatus comprising: a proxy network element arranged within a device, wherein the device is a gateway or a router, wherein the proxy network element is for managing delivery of content to a client device, said content comprising a sequence of segments, wherein each segment is encoded at a plurality of quality levels, and wherein said proxy network element is configured to:

receive a request for a first segment from a client device, wherein the first segment is encoded at a first quality level;

request the first segment from a unicast content source, and in response receiving the first segment by unicast from the unicast source;

determine a delivery time that the first segment will be delivered over a multicast channel;

deliver the received first segment to the client device over unicast in dependence on the determined delivery time;

receive a request for a second segment from the client device, wherein the second segment is encoded at a second quality level; and decide to join the multicast channel in dependence on whether the first and second quality levels are equal.

10. The apparatus according to claim 9, wherein said proxy network element is further configured to determine the delivery time using data obtained from a multicast transmitter.

11. The apparatus according to claim 10, wherein the data comprises delivery time information.

12. The apparatus according to claim 10, wherein said proxy network element is further configured to determine the delivery time using a transmission rate of the multicast channel and a size of the first segment, and the data comprises the time that transmission of the first segment started on the multicast channel.

13. The apparatus according to claim 10, wherein said proxy network element is arranged between the client device and the unicast content source.

14. The apparatus according to claim 9, wherein said proxy network element is further configured to determine the delivery time using delivery time data associated with previously delivered segments.

15. The apparatus according to claim 9, wherein the proxy network element is further configured to request timing information from a multicast server to determine the delivery time that the first segment will be delivered over the multicast channel.

16. The apparatus according to claim 9, wherein the proxy network element is further configured to make a decision to not join the multicast channel in dependence on the first and second quality levels being different.

\* \* \* \* \*